G. M. RAMSAY.
STREET SWEEPER.
No. 29,101.  Patented July 10, 1860.
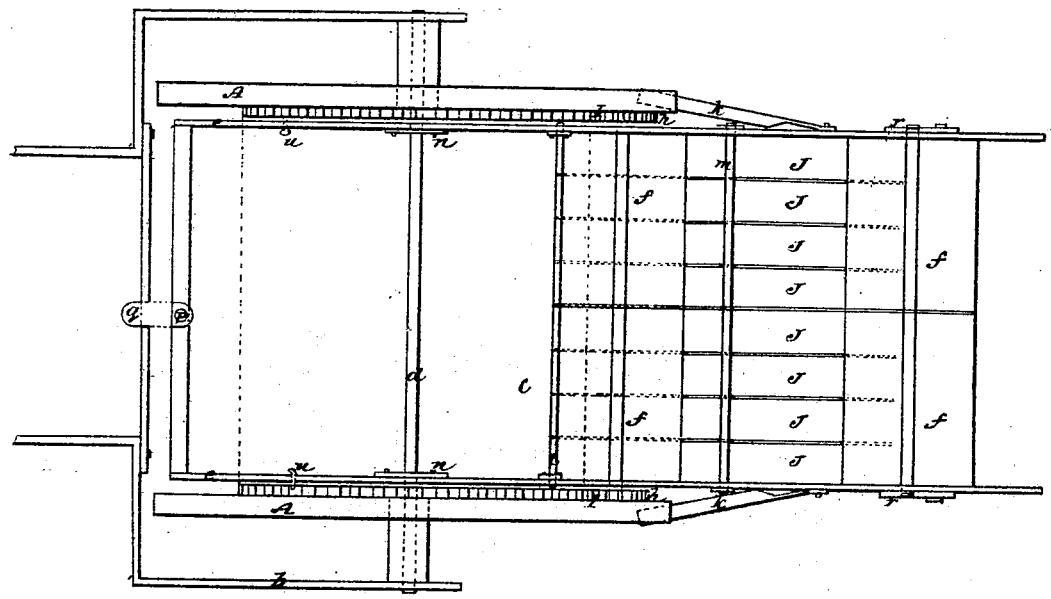
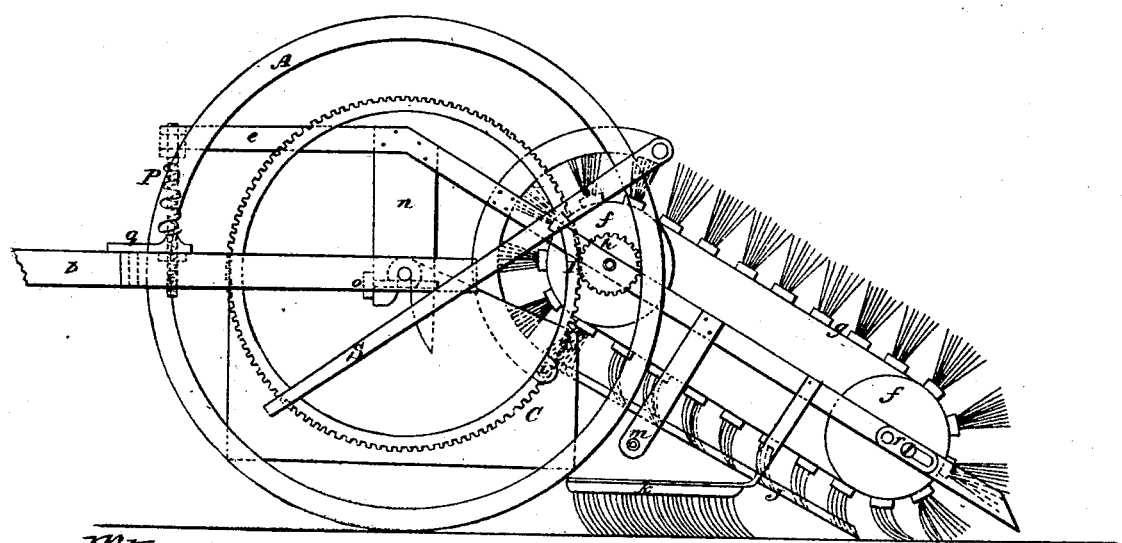
Witnesses.
Inventor.

UNITED STATES PATENT OFFICE.

GEO. M. RAMSAY, OF NEW YORK, N. Y.

MACHINE FOR SWEEPING STREETS.

Specification of Letters Patent No. 29,101, dated July 10, 1860.

*To all whom it may concern:*

Be it known that I, GEO. M. RAMSAY, of the city, county, and State of New York, have invented a new and Improved Street-Sweeping Machine, all of which is fully and clearly set forth in this specification, including the accompanying drawings, with letters of reference marked thereon, making part of the same.

Figure 1 is a side view. Fig. 2 is a top view with the brushes removed.

Like letters refer to like parts in each drawing.

A A represents two cart wheels.

$b$ represents the shafts; $c$, the dirt box.

$e$ is a swing drag frame.

$f, f, f, f$, are two pairs of pulleys upon which a pair of endless brushes G are stretched and revolve.

$h, h$, are gear pinion wheels made fast to the forward pulleys $f\ f$, and are driven by the gear wheels I, I, the axis of which is the same as wheels A, A, and by which the endless brushes G are made to revolve, while their drag end comes in contact with the street and carries the dirt up the inclined drag apron J, into the dirt box $c$.

The drag apron J, is loosely attached to the cross shaft L, and should be made of sheet iron or zinc, or equivalent material and is formed of narrow sections longitudinally, and each section is made with a flange turned up on each edge, so as to prevent the dirt from slipping off at their sides when being swept up from the street into the box $c$ by the endless brushes G. The drag aprons thus made in narrow sections accommodate themselves to irregular surfaces. The apron J is hung so that the pressure of the brushes upon the apron is decreased as they proceed from the ground to the dirt box $c$.

K, K, are two side brushes attached to the frame $e$ and are so arranged diagonally with the line of travel as to cover the extreme width of the cart wheels A, A.

$m$, is a cross shaft by which apron J is with the brushes G and K lifted from the street when required.

$r, r$, are extensors by which the endless belt may be stretched when required.

P is a standard with screw and spiral spring and clamp Q by which the degree of pressure of the brushes upon the street may be adjusted as required.

The frame $e$, with all its appurtenances, is attached to the axle $d$, by $n, n$, and secured by the pins O, in such a manner as to allow the frame $e$ with all its contents to swing concentric with the axle $d$. The box $c$ is also swung upon the axle $d$ so as to be free to revolve upon and around the axle $d$.

The frame $e$ and box $c$ have no attachments to the cart except at this one common center, and either one or both may be made removable by the withdrawal of pins O, or equivalent device.

The operation of sweeping and dumping consists in driving the cart forward which puts the brushes in motion and sweeps the dirt up the inclined apron J, into the box $c$. When the box $c$ is filled the pins O, are withdrawn and the arms S are dropped upon the street and as the cart is being driven forward the arms S lift the frame $e$ with all its contents from the axle $d$ and the whole is left standing in the street, while the cart is taken to the dumping ground and emptied of its dirt by tilting the box $c$ either forward or backward, which operation may be facilitated by the insertion of a pin $n$ into the side of I, which will tilt the box $c$ when the cart is put in motion. The pin $n$ should be withdrawn when the box $c$ has resumed its correct position. When the cart is returned to the brushes it is backed under when the arms S lower the brushes upon the axle $d$ and the pins O, are inserted and the whole is again ready for sweeping.

The hind pulleys $f\ f$ may be made in sections the same width of each section of the inclined apron J, so as to rise and fall in concert with each section in passing over irregular surfaces.

To make the whole tractive power of the wheels A A available it is better to drive the brushes with gearings from each driving wheel, which will require a division of the brushes longitudinally, which also gives a greater facility for turning the machine.

By stretching canvas over the box $c$ the dust is prevented from escaping.

Small scrapers made of sheet iron bent at right angles and riveted to the endless belts in place of brushes will serve for brushes in taking slush and mud from the street.

Having thus fully described my invention, what I claim and desire to secure by Letters Patent is—

1. The manner of attaching and detaching the frame $e$ brushes G and K, pinion $h$ and apron J to, and from the axle $d$.

2. The revolving dirt box $c$ when in combination with frame $e$ and its appurtenances as described.

GEO. M. RAMSAY.

Witnesses:
R. T. RICH,
F. McSWEGAN.